United States Patent [19]

Moritomo

[11] Patent Number: 5,014,325

[45] Date of Patent: May 7, 1991

[54] APPARATUS FOR DISCRIMINATING SPECIFIED SORTS OF PRINTED MATTERS

[75] Inventor: Shigeru Moritomo, Toyonaka, Japan

[73] Assignees: Nihon Eiwan Denshikiki Co., Ltd.; I.M. Electronics Co., Ltd., both of Osaka, Japan

[21] Appl. No.: 781,660

[22] Filed: Sep. 30, 1985

[30] Foreign Application Priority Data

Feb. 1, 1985 [JP] Japan .................................. 60-18996

[51] Int. Cl.⁵ .............................................. G06K 9/00
[52] U.S. Cl. ........................................ 382/7; 356/71; 340/825.34; 382/30
[58] Field of Search ............ 382/7, 30, 34, 64, 825.34; 356/71; 209/534

[56] References Cited

U.S. PATENT DOCUMENTS 3,896,292 7/1975 May et al. .......................... 235/450
4,246,474 1/1981 Lazzari ................................ 235/450
4,283,708 8/1981 Lee ...................................... 382/7
4,442,541 4/1984 Finkel et al. ........................ 382/7
4,464,787 8/1984 Fish et al. ............................ 382/7
4,547,899 10/1985 Nally et al. .......................... 382/7

Primary Examiner—David K. Moore
Assistant Examiner—J. Mancuso

[57] ABSTRACT

An apparatus for discriminating specified sorts of printed matter is provided with a magnetic sensor reading an identification pattern that is printed on printed matter such as a bill, a check and the like using magnetic ink and outputting a pattern signal; a standard memory part storing a standard signal; and a comparison part comparing the above-mentioned pattern signal with the above-mentioned standard signal in their respective reference positions and also in a position where they are made to offset relatively from those reference positions; whereby the precision in identifying the printed matter is improved.

8 Claims, 11 Drawing Sheets

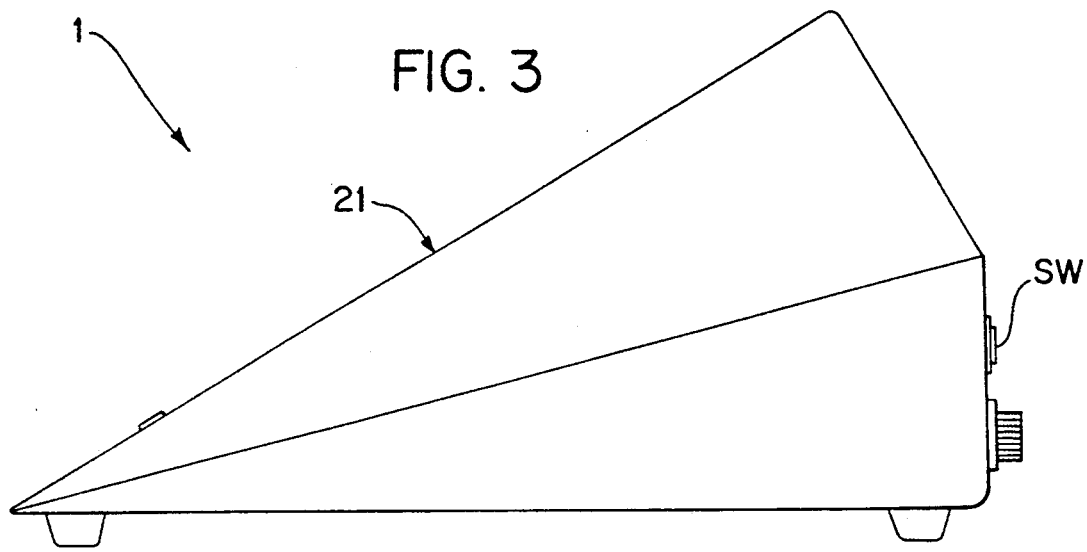
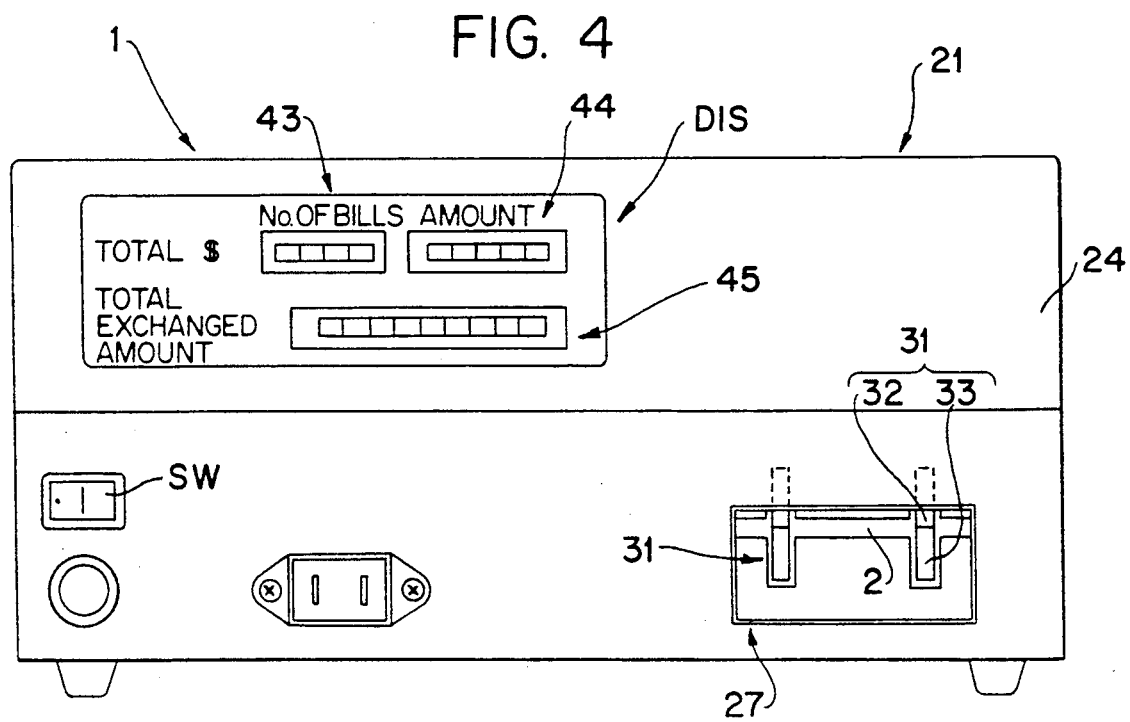

APPARATUS FOR DISCRIMINATING SPECIFIED SORTS OF PRINTED MATTERS

BACKGROUND OF THE INVENTION

Heretofore, there has been used an apparatus that can read by means of a magnetic sensor, an identification pattern like a diagram or a character being printed on printed matter, for example, a bill, a check, and the like whereby whether the document is genuine or spurious is discriminated or further various sorts of documents such as the denominations of currency are identified.

In the past, apparatus of this type has had magnetic sensor disposed in the interior of the passage wherethrough printed matter was fed in, and thereby compared a pattern signal with a standard signal, both being detected with a reference position being set, for example on the front edge of the printed matter, in a one and only position where their respective reference positions were made to coincide each with other, as a consequence of which there occurred a moot point that a discrepancy arose between the pattern signal of the magnetic sensor and the standard signal thereof resulting from the expansion and contraction of the above-mentioned printed matter, or from the shearing in printing thereof, or from the till of the printed matter within the feeding passage, all of these phenomena being attributable, for example, to the wearing-out by use of the printed matter or further to shrivelling thereof, with the result that the identification precision was lowered. By the way, in particular for the dollar bills of America where the worn-out bills are never withdrawn from circulation in order, such mooted point is revealed more markably.

BRIEF SUMMARY OF INVENTION

It is an object of this invention to provide an apparatus for discriminating specified sorts of printed matter, which is able to discriminate the genuiness and spuriousness of printed matter or the type thereof with high precision even when the discrepancy occurs between a above-mentioned pattern signal and the standard signal.

Another object of this invention is to provide an apparatus for discriminating specified sorts of printed matter, which is able to feed even a printed matter so feeble as seen in a worn-out bill into the passage smoothly.

BRIEF DESCRIPTION OF THE DRAWINGS

FIG. 3 is a side view thereof;

FIG. 4 is a rear elevation thereof;

DETAILED DESCRIPTION

With reference to the accompanying drawings, description will be now directed to an example in which the apparatus for discriminating specified sorts of printed matter according to the invention is employed as a discriminator at the time of bill counting while identifying various denominations of paper currency and discriminating the authenticity thereof.

Figure 15:
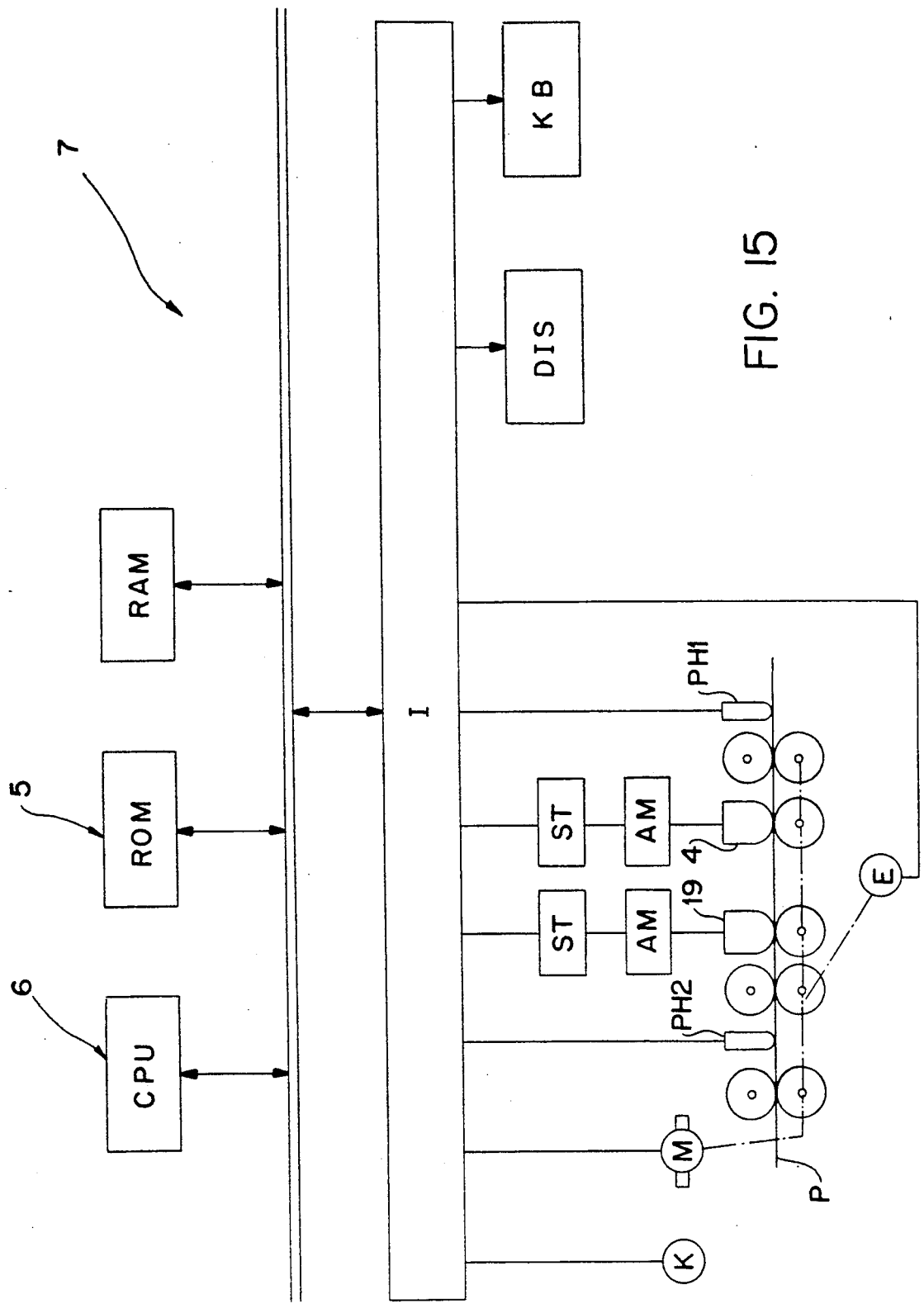
FIG. 15 is a block diagram showing a control means thereof.

In FIGS. 1 to 5, the apparatus for discriminating specified printed matters 1 has a magnetic sensor 4 which is disposed in a passage 2 whereinto printed matter P is to be fed, detects an identification pattern 3 being printed on the printed matter P using magnetic ink, and outputs a pattern signal S1, (FIG. 7) the above apparatus is further provided with a control means 7 as shown in FIG. 15 being equipped both with a standard memory part 5 storing a standard signal A which is to be compared with the above-mentioned pattern signal S1 and with a comparison part 6 comparing and distinguishing between the standard signal A and the pattern signal S1. On the other hand, in this example, the identified denomination of the printed matter P as a dollar bill of America is indicated on the display part DIS being provided at the main body 21.

This main body 21 is of a sloping-down-toward-the front shape when viewed from the flank, which is made up by being provided around a rectangular bottom plate 22 with a back plate 24 and two side plates 25 and by mounting a top plate 23 thereon. The top plate 23 is of the nearly same size as the bottom plate 22 and is placed at an angle of about 30° to the latter. Further, the back plate 24 has a lower plate part 24A and an upper plate part 24B both being placed at a right angle to the bottom plate 22 and the top plate 23, respectively. On the other hand, in the main body 21, there is provided at its front face with an inserting port 9 whereinto the printed matter P can be inserted, while there is bored a taking-out port 27 at the above-mentioned lower plate part 24A of the back plate 24.

The above-mentioned passage 2 takes the form of a flat and square envelope, the front and rear ends of which can communicate with the above-mentioned inserting port 9 and taking-out ports 27, respectively. Further, the passage 2 is provided with feeding means 31 which feed the printed matter P being inserted in the inserting port 9 into the interior of the passage 2 itself.

The above-mentioned feading means 31 consists of a holding roller 32 and a driving roller 33, which are disposed above and below facing each other with the passage 2 between. In this example, the feeding means 31 of this kind are provided in six places in total on both sides of the front and rear end parts and also of the central part. Each of these feeding means 31 is connected to a motor M through a suitable transmission mechanism such as, for example, a timing belt and is able to carry the printed matter P toward the taking-out port 27 or contrariwise toward the inserting port 9 in accordance with the normal or reversal motion of the motor M.

There are disposed within the above-mentioned passage 2 on the center line in width a magnetic sensor 4 to the side of the feeding means 31 of the front end part of the passage 2 and a magnetic sensor 19 to the side of the feeding means 31 of the central part thereof. The above magnetic sensors 4, 19 each are additionally provided with pinch rollers 34 being encouraged toward the very magnetic sensors 4, 19 with the aid of spring means 35.

The pinch rollers 34 are provided at one end part of arm bodies 39 which are able to swing up and down by their central part being supported on horizontal pivot pins 37, while the two other end part of the arm bodies 39 are attached, for example, to the bottom plate 22 through the interposition of spring means 35 such as tension springs. Therefore, the pinch rollers 34 are encouraged upward to the respective magnetic sensors 4 and 19. Further, the pinch rollers 34 are connected to the above-mentioned motor M by the use of a suitable transmission mechanism, and rotate in the same direction and at the same circumferential speed as the above-mentioned driving roller 33.

Connected to the above-mentioned motor M is, further, a rotary encoder E, which outputs a timing signal S3 being proportional to the feeding speed of the feeding means 31. Incidentally, the cycle of it is, in this example, of 0.2 on the printed matter P.

The above-mentioned display part DIS consisting, for example, of a number of fluorescent tubes is provided at the front face of the main body 21, and is provided with the "total number of bills" field 41 indicating the total number of bills processed and the total amount of money for each denomination from 100 down to one-dollar bill, and with the "total amount of money" field 42. Further, there are provided at the front face of the main body 21 with the "grand total number of bills" field 43 and the "grand total amount of money" field 44, indicating respectively the above-mentioned several total number of bills and the amounts of money both being separately summed up, and further the "exchanged amount of money" field 45 indicating the above-mentioned separate amounts of money being summed up altogether and converted in terms of, for example, Japanese currency, and further the same ones as these three fields 43, 44, and 45 are also provided at the upper half part of the back plate 24 of the main body 21.

On the other hand, there is provided at the front face of the main body 21 below the display part DIS of the front face of the main body 21 an input key KB including a ten-key pad and being used to input the above-mentioned exchange rate. There are further provided at the lower half part of the back plate of the main body 21 a power switch SW, a power connector, and a fuse.

Figure 1:
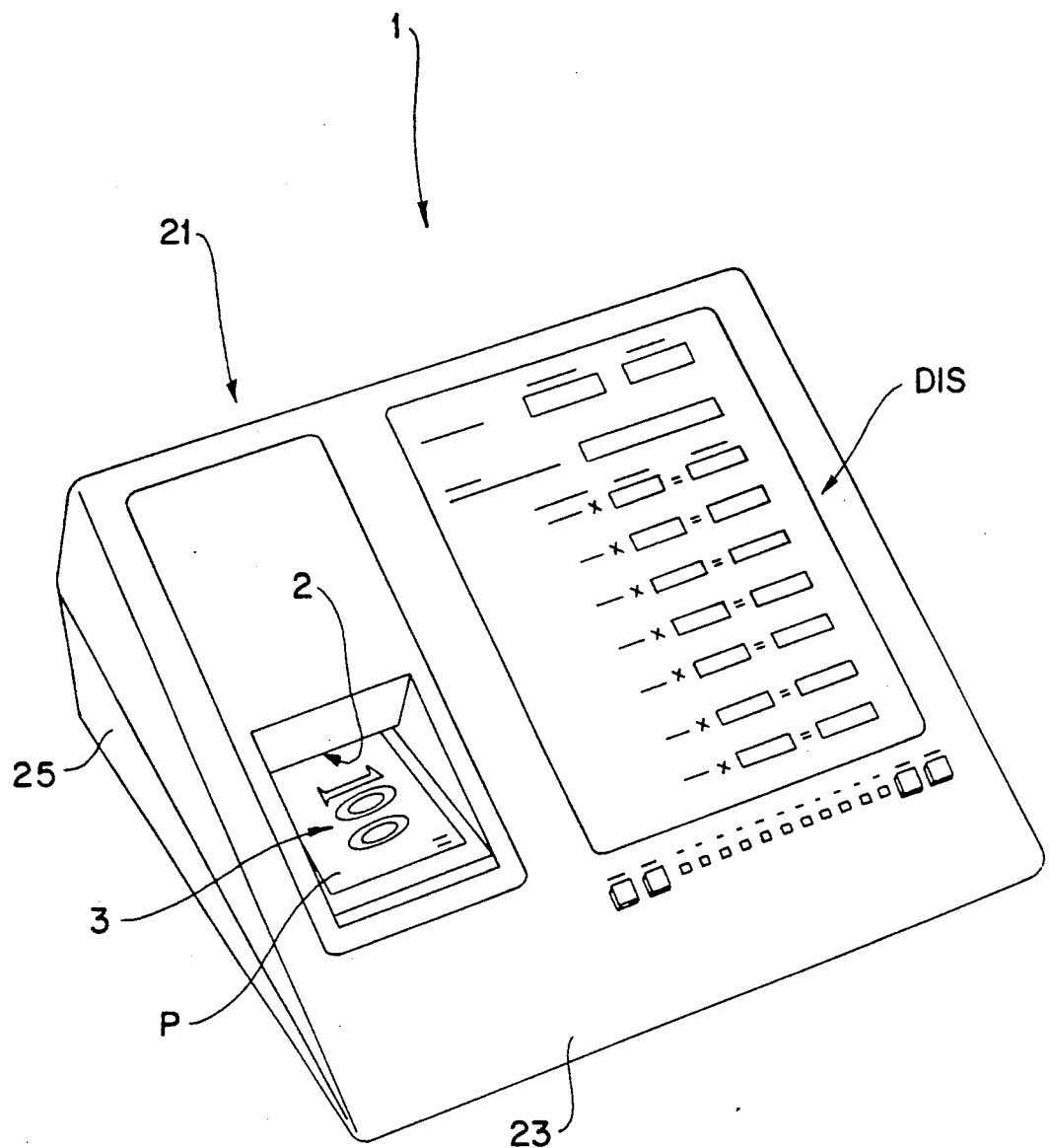
FIG. 1 is a perspective view showing an example of this invention.
Figure 2:
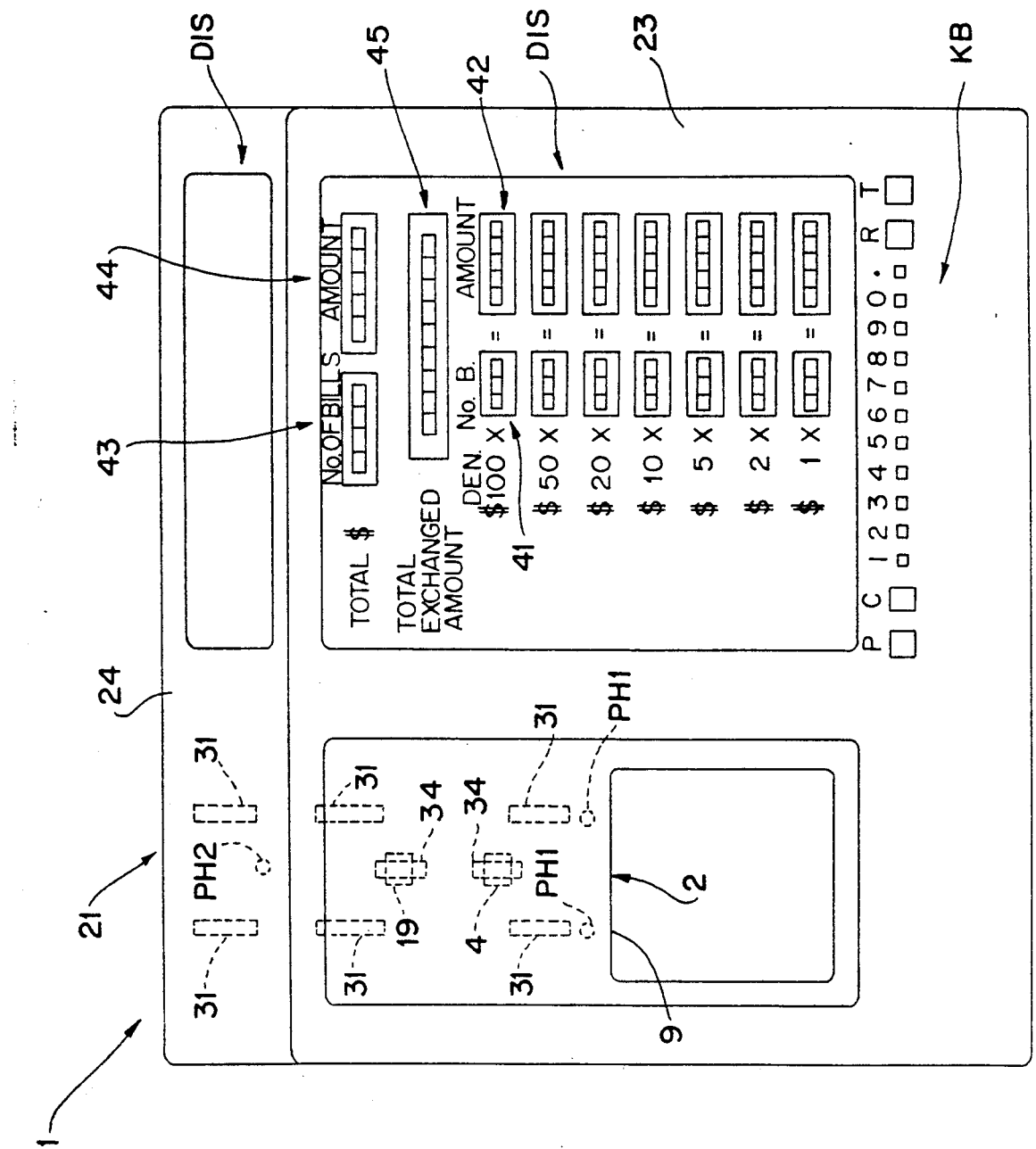
FIG. 2 is a top plan view thereof.
Figure 5:
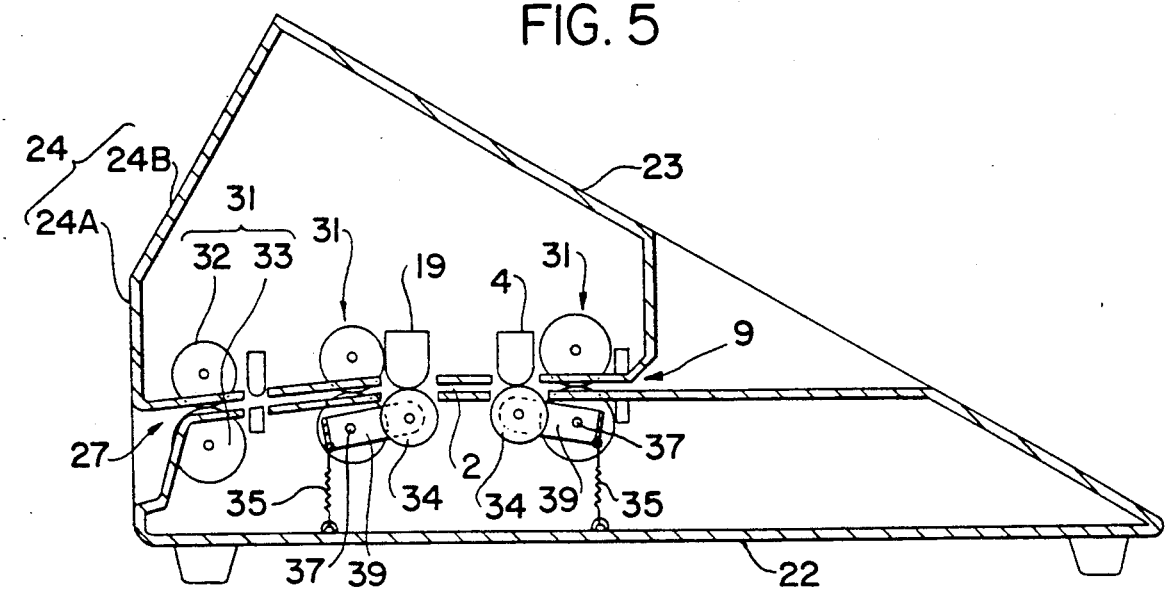
FIG. 5 is a sectional view thereof.
Figure 6:
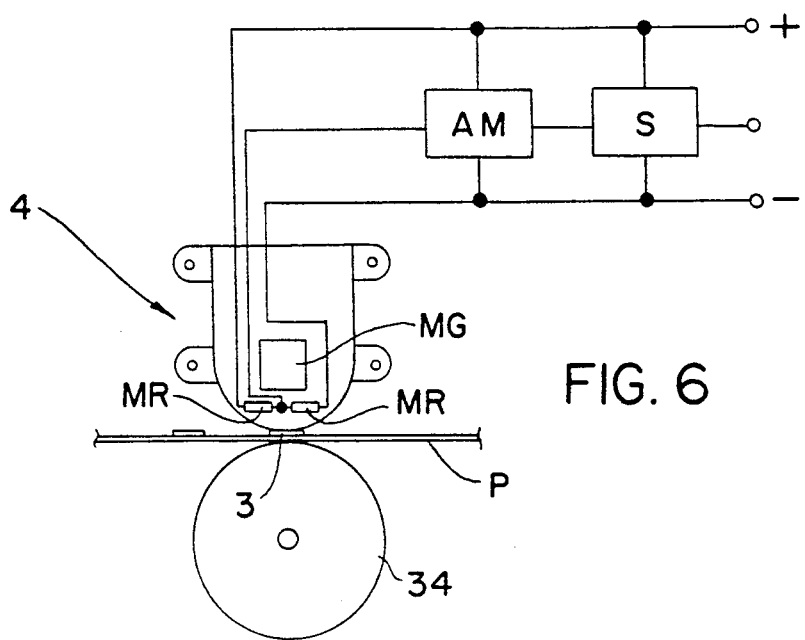
FIG. 6 is a diagram illustrating a magnetic sensor thereof.

The above-mentioned magnetic sensor 4 in this example consists of a pair of magnetic resistance elements MR, being disposed in the feeding direction of the printed matter P as shown in FIG. 6, and is molded integrally with a permanent magnet MG for use in biasing, to detect the variation of the magnetic field due to the transition of the magnetic body contained in the magnetic ink. Accordingly, the magnetic sensor 4 has the ability to detect the identification pattern 3 being printed on the middle part of the printed matter P by the use of magnetic ink when the printed matter P is travelling through the passage 2. By the way, the above-mentioned magnetic resistance elements MR, are connected in series between the positive and negative terminals of the power source and receive output from their middle point.

Figure 7:
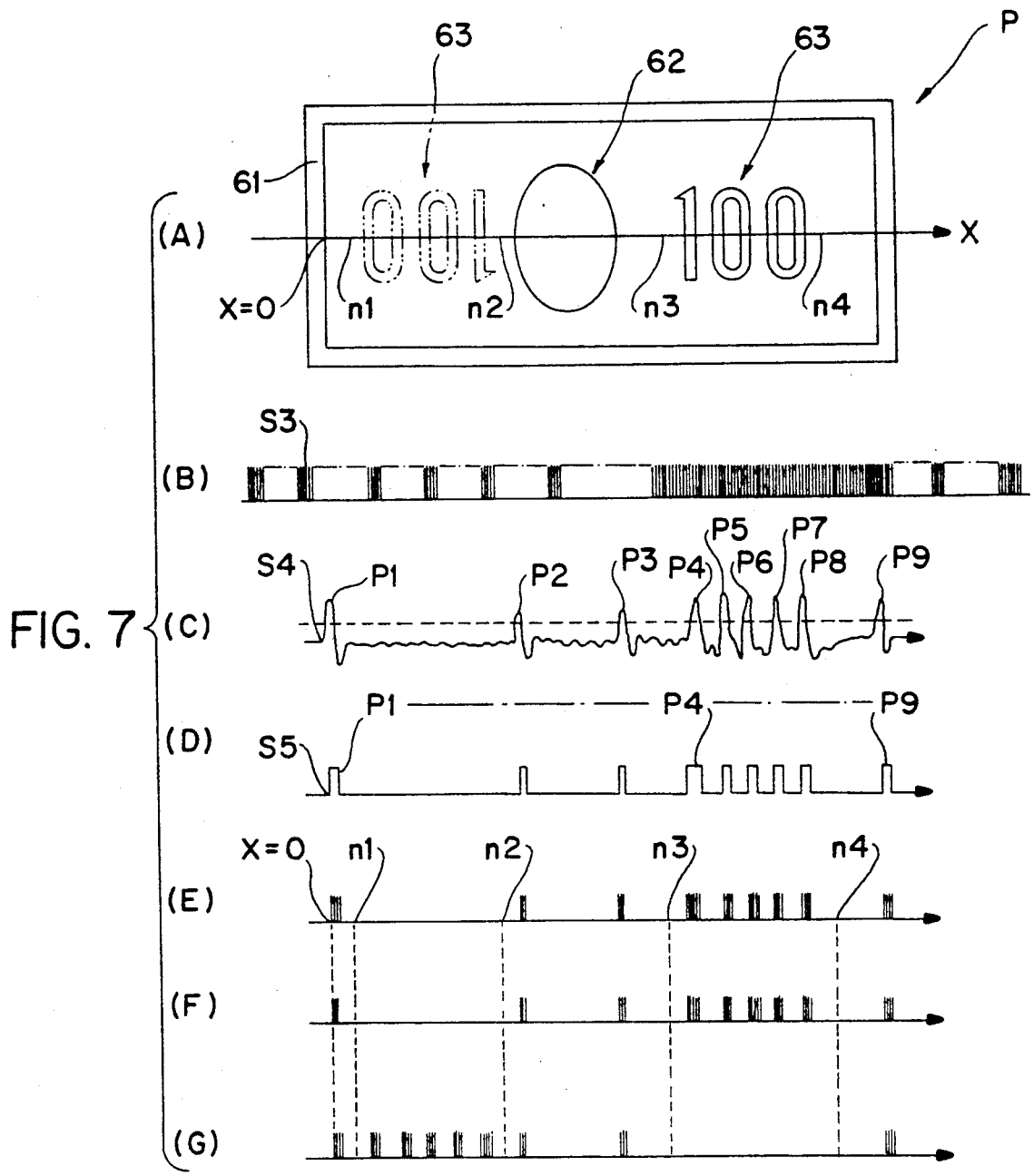
FIG. 7 is a diagram exemplifying the signal waveform of each part thereof.
Figure 8:
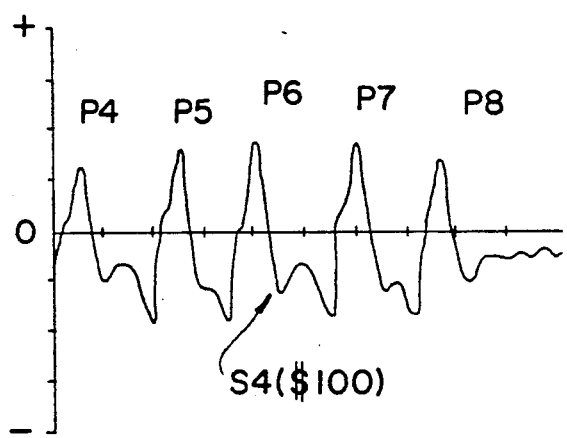
FIGS. 8 to 14 are waveform views showing the output waveforms of the magnetic sensor.
Figure 9:
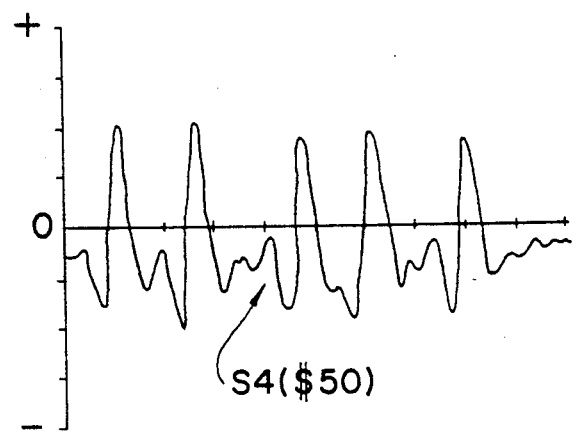
Figure 10:
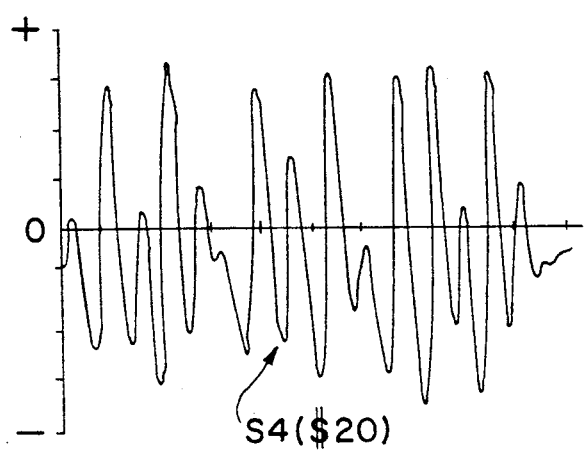
Figure 11:
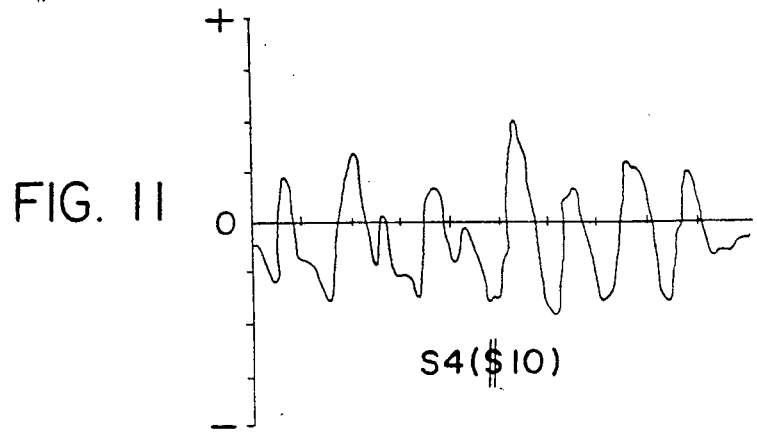
Figure 12:
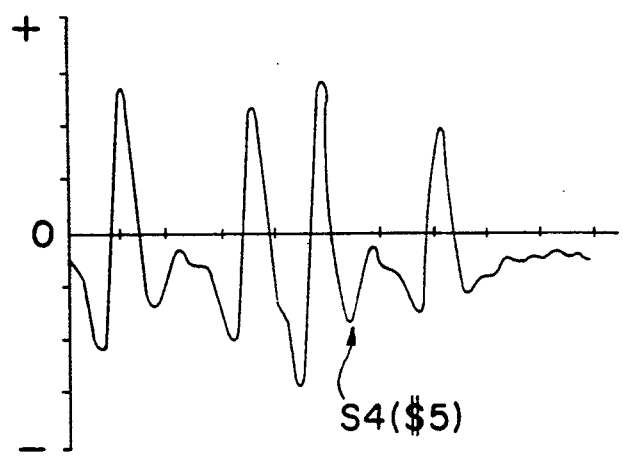
Figure 13:
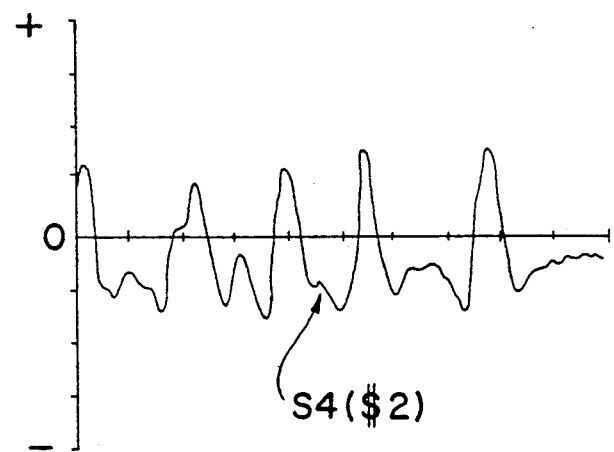
Figure 14:
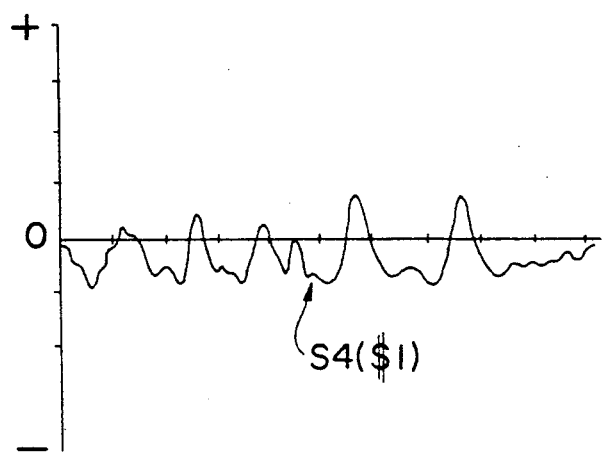

As shown in FIG. 7 taking the case of, for example, the 100-dollar bill, the magnetic sensor 4 outputs an analog signal S4 including relatively high-level pulses P1 to P9 corresponding to the relatively broad border line 61, the oval enclosing the portrait part 62, and each figure of the part with the declared value 63.

Further in this example, the identification of the various denominations is performed by considering the part with value declared 63 on the right side of the portrait part 62 being situated in the middle part of the obverse of the printed matter P as the identification pattern 3, as previously described, and by detecting it by the magnetic sensor 4. There are shown in FIGS. 8 to 14 the respective signal waveforms being fetched by the magnetic sensor 4 from each identification pattern 3 of each of all American denominations (100 to 1-dollar). Also the above-mentioned portrait part 62 is used for discriminating the authenticity by being detected by means of the magnetic sensor 19 consisting of a coiled magnetic head.

The above-mentioned passage 2 is further provided with detectors PH1, PH2, for example, such as a pair of a phototransistor and a LED for the purpose of detecting the printed matter P. The detector PH1 is placed at the front end part of the passage 2, while the detector PH2 is provided at the rear end part of the passage 2 before the feeding means 31 to the side of the taking-out port 27.

In this example, as shown by the block diagram of FIG. 15, the above-mentioned control means 7 is a microcomputer provided with a microprocessor CPU forming the comparison part 6, ROM and RAM together forming the above-mentioned standard memory part 5, and the interface I. Each of the above-mentioned units is interconnected by means of a data bus, an address bus, and a control line, and is operated by the program previously stored within ROM. The above-mentioned magnetic sensors 4, 19 are connected to the interface I through an amplifying circuit AM and a waveform shaping circuit ST, while the detectors PH1, PH2, the rotary encoder E, the display part DIS, the input key KB, the motor M, and the alarm K are connected also to the same interface I.

Figure 16:
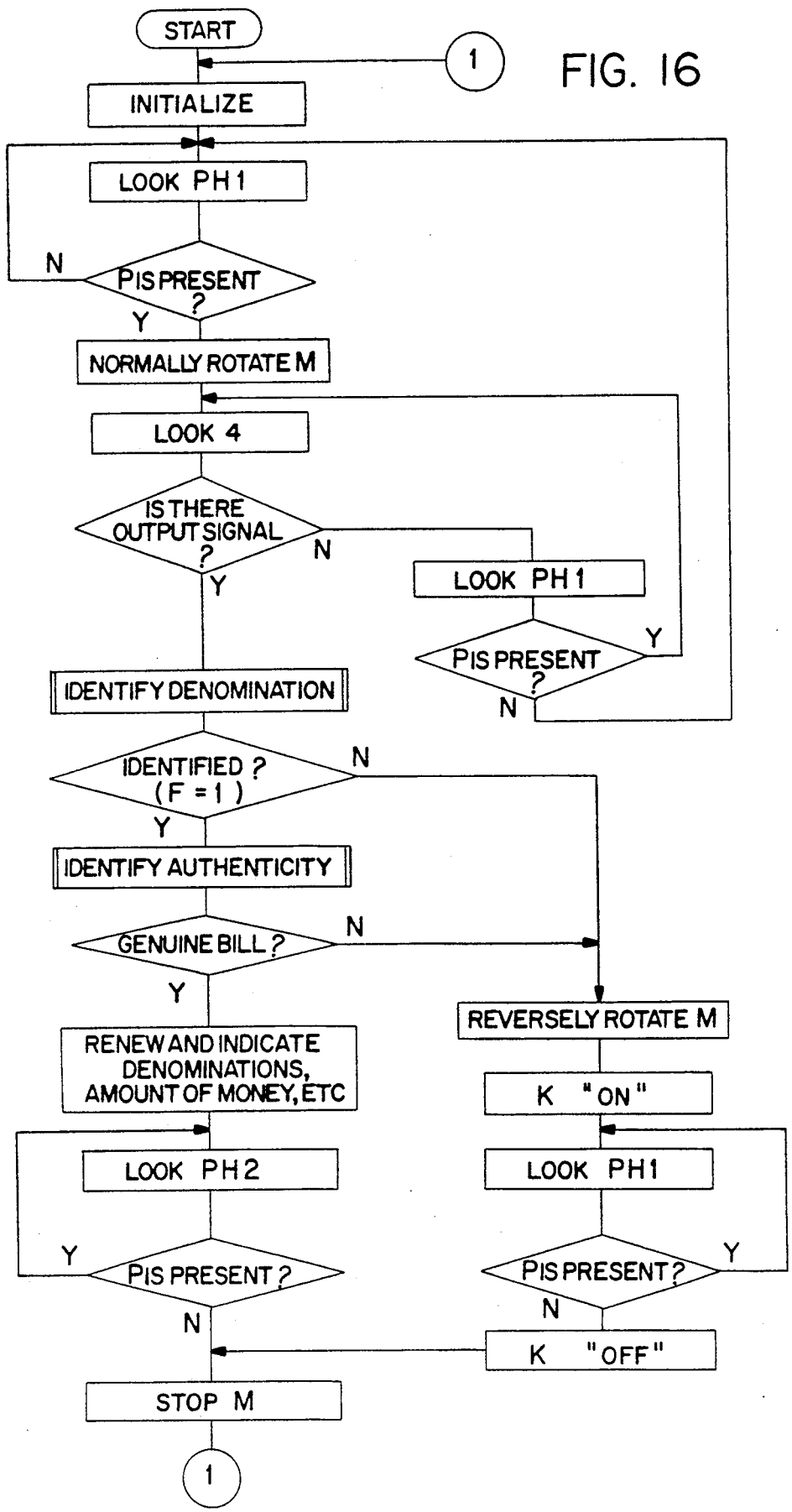
FIGS. 16 to 19 are flow charts showing the behaviors thereof.

Description will be now directed to the behavior of the above-mentioned control means 7 with reference to the flow chart of FIG. 16:

At the same time when the program stored within the above-mentioned ROM, starts automatically by the switching on of the power switch SW at the rear face of the main body 21, the control means 7 makes the initialization. The control means 7 then detects the insertion of the printed matter P through monitoring the output signal of the detector PH1 and makes the motor M rotate normally.

Subsequently, the feeding means 31 feeds the printed matter P into the passage 2, in concurrence with which the control means 7 monitors the output signal of the magnetic sensor 4 and decides whether the printed matter P has been normally fed in or not by detecting the signal generation attendant on the passing of the above-mentioned border line 61 of the printed matter P.

The control means 7 makes the identification of denominations at the comparison part 6 in accordance with a procedure hereinafter described. When the identification of the denominations is completed, the discrimination of the authenticity is performed on the basis of the output signal of the magnetic sensor 19. If the result is that the denominations in question are discriminated as genuine bills, the number of those bills and the corresponding amount of money are added to the total number of bills processed and the total amount of money of the denominations coming under the "total number of bills" field 41 and the "total amount of money" field 42, respectively, in proportion to which each of the displaying numerals of the "grand total number of bills" field 43, the "grand total amount of money" field 44, and the "exchange amount of money" field 45 are renewed in order. On the other hand, the control means 7 monitors the above-mentioned detector PH2 provided at the outlet of the passage 2, and, after detecting that the printed matter 2 has been sent out to the taking-out port 27, stops the motor M.

Further, in case the printed matter P is unidentifiable or it proves to be a spurious bill at the time of identifying the above-mentioned denominations or of discriminating their authenticity, the control means 7 puts the motor M into a reverse rotation to send the printed matter P back up to the inserting port 9, and at the same time puts the alarm K consisting of a buzzer in the ON position to give warning. After the lapse of a certain period time or simultaneously with the printed matter P having been sent back up to the inserting port 9 removed, the control means 7 puts the alarm K in the OFF position to stop the motor M. After that, the control means 7 returns to a state of standing ready for the reinsertion of the printed matter P.

In the state of standing ready for the reinsertion of the printed matter P, the above-mentioned input key KB provided below the display part DIS has the ability to clear each display on the display part DIS, and also to indicate the input of the exchange rate, or the total display of the number of bills processed and the amount of money.

Figure 17:
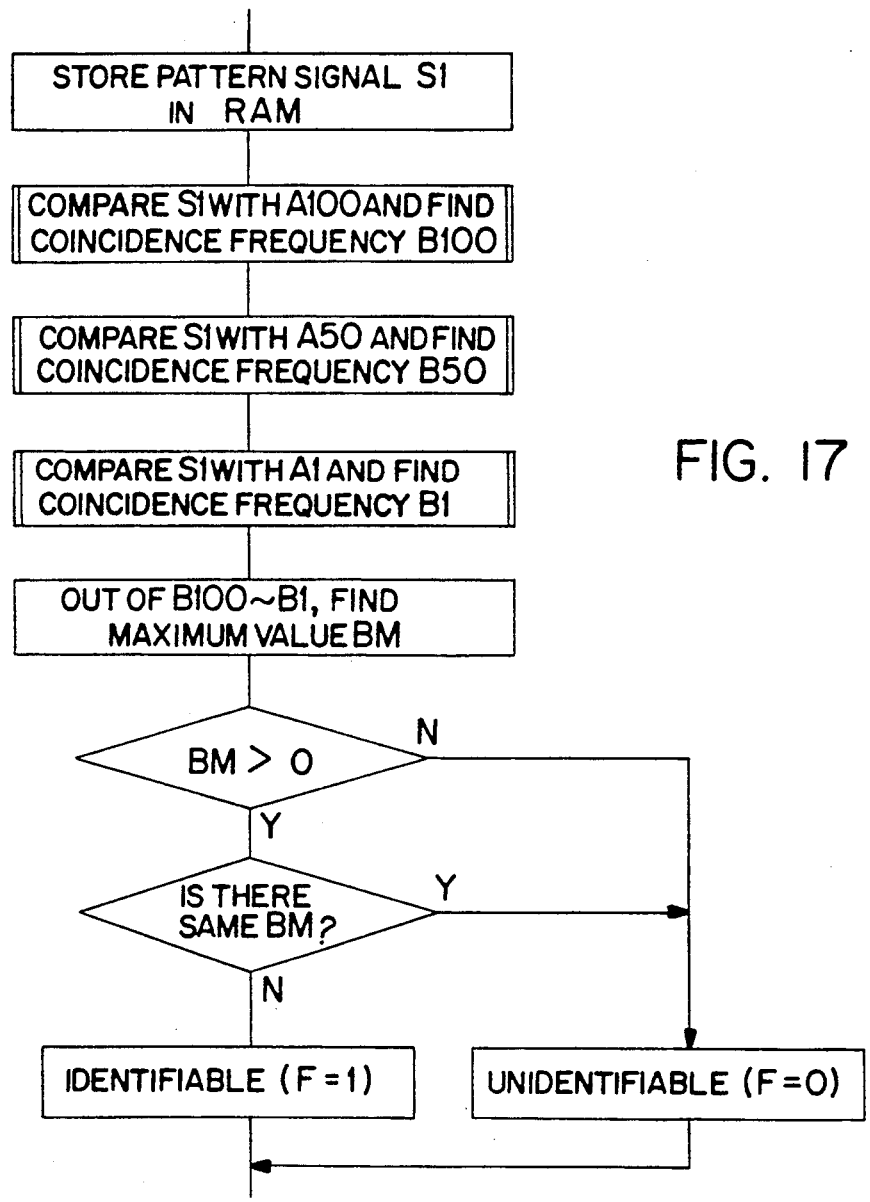

Description will be now directed to the behavior of the control means 7 in identifying the denominations with reference to FIG. 7, FIG. 16, and FIG. 17:

As soon as the printed matter P is inserted into the inserting port 9, the motor M starts to rotate, as mentioned above, and the rotary encoder E outputs the timing signal S3 every 0.2 mm, on the printed surface of the printed matter P, while the magnetic sensor 4 outputs the analog signal S4 including the pulses P1~P9 of a relatively high level corresponding to the border line 61, the portrait part 62, and the part with declared value 63, as mentioned above. On the other hand, the waveform shaping circuit ST consisting of, for example, a Schmitt trigger circuit outputs the digital signal S5 which is the above-mentioned analog signal S4 being standarized on a certain fixed threshold level. Each of these signals S3, S4, and S5 is added to the input port of the interface I.

As shown in the flow chart of FIG. 16, the control means 7 stores in RAM of the standard memory part 5 the digital signal S5 having been sampled at an interval of the above-mentioned timing signal S3 while treating the pulse P1 of the digital signal S5 of the waveform shaping circuit ST as a trigger signal. When viewed in this way, the above-mentioned pattern signal S1 in this example is simply a signal having been sampled at an interval of 0.2 mm regarding the border line 61, that is, the reference position as the starting point on the printed matter P from the digital signal S5 which is the analog signal S4 of the magnetic sensor 4 on the basis of the timing signal S3 of the rotary encoder E.

As for the above-mentioned standard signal A, it includes, for example, the standard signal A 100 which is extracted from the 100-dollar bill among a large number of genuine bills in every denomination and is standardized by the same method as that by which the above-mentioned pattern signal S1 has been obtained, and similarly includes the standard signals A50, A20, A10, A5, A2, and A1 which are extracted from the 50, 20, 10, 5, 2, and 1-dollar bill, and is retrievably stored in the above-mentioned standard memory part 5.

As shown in the flow chart of FIG. 17, the control means 7 compares at the comparison part 6 each of the bit patterns of the pattern signal S1 being stored in RAM with each of the bit patterns of the standard signal A100, and counts the coincidence frequency B100 of those bits, and then similarly compares the pattern signal S1 with the standard signals A50~A1 and finds the coincidence frequency B50~B1 of them, respectively.

Subsequently, only when finding the maximum value BM out of the coincidence frequency B100~B1 and being proven that the very maximum value BM is positive and there is not any other one attaining the same maximum value BM, that maximum value BM is regarded as identifiable, and, its flag F is marked with 1 (one), while all others are disregarded as unidentifiable, and flag F is marked with 0 (zero).

Figure 18:
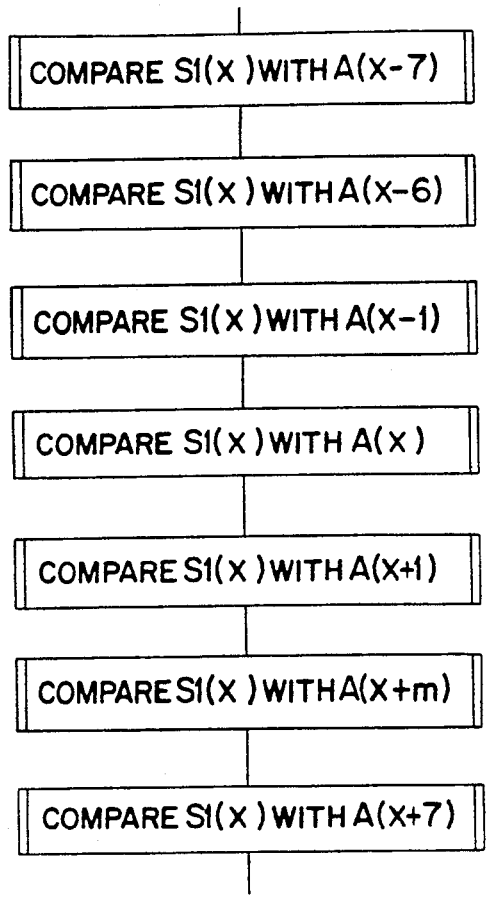
Figure 19:
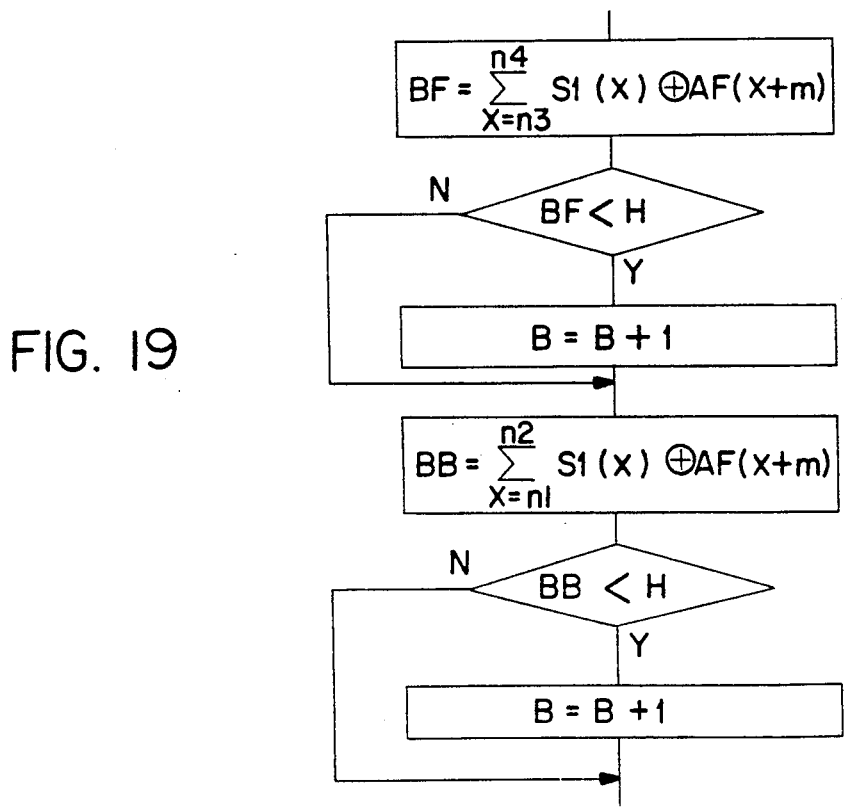

Description will be now directed to the behavior of the control means 7 which compares the pattern signal S1 with the standard signal A, and thereby tries to find the coincidence frequency B of both with reference to FIGS. 18 and 19:

At this time, let it be supposed that the xth bit patterns of both the pattern signal S1 and the standard signal A are expressed as S1 (x) and as A (x), respectively, and the above-mentioned reference position is expressed as $x=0$.

There is performed by the comparison part 6 the comparison of the bit pattern S1 (x) of the pattern signal S1 fetched from RAM with the bit pattern A (x+m) of the standard signal A fetched from the standard memory part 5 to the microprocessor CPU forming the above-mentioned comparison part 6.

In this example, when the value of the aforesaid m attains $-7 \sim +7$, the comparison is done by distinction at two positions: one is a position in which the respective reference positions of the pattern signal S1 and the standard signal A coincide each with other, that is, in which $m=0$, and the other is a position in which the above-mentioned reference positions are made to offset each other by a small interval (in this example, by 0.2 mm).

FIG. 19 is a flow chart exemplifying the motion of comparing the above-mentioned two bit patterns S1 (x) and A (x+m) in the comparison part 6.

The above-mentioned standard signal A in this example is provided with the normally directed standard signal AF and the reversely directed standard signal AB in regard to every denomination of the dollar bills, wherefore the control means 7 is able to identify the printed matter P regardless of its inserting direction.

On the other hand, the range of x inclusive of the identification pattern 3, the values $x=n1 \sim n2$ before it or the values $x=n3 \sim n4$ after it is previously stored in ROM.

First, the comparison part 6 calculates the exclusive OR of each of the bit patterns S1 (x) of the standard signal S1 and each of the bit patterns (x+m) of the above-mentioned normally directed standard signal AF within the range of $x=n3 \sim n4$, and treats the total of it as the incoincidence frequency BF. Secondly, when the above-mentioned incoindence frequency BF is below a predetermined fixed decision value H, it is decided that the pattern signal S1 coincides with the standard signal AF, adding 1 (one) to that coincidence frequency B, but when being above the decision value H, it is decided to be incoincident. Thirdly, the exclusive OR of the above-mentioned bit pattern S1 (x) and the bit pattern AB (x+m) of the above-mentioned reversely directed standard signal AB is calculated within the range of x=n1~n2, the total of it is treated as the incoincidence frequency BB in the reverse direction, and when that incoincidence frequency BB is below the decision value H, 1 (one) is added to the above-mentioned coincidence frequency B.

In accordance with the above-mentioned, the control means 7 is able to make the identification of the denomination in the comparison part 6 by means of the identification pattern 3 regardless of the inserting direction of the printed matter P.

Further, the comparison part 6 compares the pattern signal being detected by the magnetic sensor 19 corresponding to the identification pattern composed of the portrait part 62, with the standard signal stored in the standard memory part 5 while distinguishing between them in the position where their respective reference positions are made to coincide each with other and in the position where the same reference positions are made to offset each other by a small interval, whereby the authenticity of the printed matter P is discriminated.

With such an arrangement, whenever the printed matter P is inserted in the inserting port 9 to be fed into the passage 2, the identification pattern 3 can be detected by the magnetic sensor 4.

This magnetic sensor 4 is able to output the pattern signal starting from the reference position, namely, the border line 61.

The control means 7 compares at its comparison part 6 the above-mentioned pattern signal S1 with the standard signal A fetched from the standard memory part 5 while distinguishing them in the position where the above-mentioned reference positions are made to coincide each with other and in the position where those reference positions are made to offset each other by a small interval, in this example by 0.2 mm, on the printed matter P. Therefore, the control means 7 is able to discriminate with precision the identification pattern 3 representing the denomination and other characteristics of the printed matter P even when there occurs a shift in the feeding direction of the printed matter P or the non-alignment of it within the passage 2.

At this time, the pinch roller 34 is encouraged toward the magnetic sensor 4 so as to be able to hold the printed matter P against the magnetic sensor 4 whereby the detecting precision of the magnetic sensor 4 can be enabled, while on the other hand this pinch roller 34 is able to insert the printed matter P beneath the magnetic sensor 4 or to make it pass therethrough because the pinch roller 34 is rotating in the same direction and at the same circumferential speed as the driving roller 33.

The display part DIS indicates, referring to every denomination, the number of bills processed, the total amount of money, the grand total number of bills processed, the grand total amount, and the rate-exchanged amount of many automatically so as to be easily ascertained, thereby preventing a mistake in calculation.

Incidentally, in the apparatus for discriminating specified sorts of printed matter according to this invention, there can be used in the capacity of the magnetic sensor 4 besides a magnetic resistance element MR what is called a magnetic head using a coil or a hall device and others. Referring to the comparison part 6 which distinguishes by comparison between the pattern signal S1 and the standard signal A, it is possible to distinguish distinguishing the pattern signal S1 without being stored in RAM.

It may be said in conclusion that the apparatus for discriminating specified sorts of printed matter can be modified in various embodiments, for example, by being built-in integrally with what is called an automatic vending machine and the like.

As described above, the apparatus for discriminating specified sorts of printed matter according to the invention is such that is is equipped at its printed matter-feeding passage with the magnetic sensor outputting the pattern signal having detected the identification pattern being printed using magnetic ink starting from the reference position, and that is provided with a control means having as a part the comparison part which compares the above pattern signal with the standard signal while distinguishing between them in the position where the above-mentioned reference positions are made to coincide each with other and in the position where those reference positions are made to offset each other by a small interval, wherefore this apparatus is able to produce various effects that can identify precisely the identification pattern, that elevates the reliability of the apparatus itself, and so on even when there occurs a the shift in the feeding direction of the printed matter, or a slip attributable to the tilt of the printed matter within the passage, as compared with the one heretofore in use wherein the distinction by comparison is conducted only in the position where the reference positions are made to coincide.

What is claimed is:

1. An apparatus for discriminating printed matter having an identification pattern printed in magnetic ink, comprising:
   (a) an input passage having a printed matter-inserting port;
   (b) feeding means for feeding the printed matter inserted in the inserting port into the passage;
   (c) magnetic sensor means for magnetically scanning the printed matter fed into the passage along a given path thereof, and producing an analog pattern signal corresponding to the identification pattern thereon;
   (d) timing signal generating means for producing a timing signal with a time interval proportional to the feed speed of the feeding means;
   (e) standard memory means for storing a standard signal including at least a series of digital reference data; and
   (f) control means including means for,
      sampling and digitizing said analog pattern signal in response to said timing signal for producing a series of digital sample data indicative of the amplitudes of the analog pattern signal,
      comparing the digital reference data with the digital sample data respectively a plurality of times wherein the series of reference data is successively shifted relative to the series of sample data by a datum corresponding to the time interval of the timing signal, for the occurrence of a coincidence in reference positions of the sample data and reference data.
      counting the number of coincidences or non-coincidences of the respective data occurring in the comparison for each data-shifted time,
      determining a coincidence or non-coincidence of the series of the sample data and the series of the reference data by the number of coincidences or non-coincidences counted each time, and outputting an output signal indicative of the determined coincidence or non-coincidence of the series of the sample data and the series of the reference data.

2. An apparatus as set forth in claim 1, wherein said magnetic sensor means comprises a pair of magnetoresistive elements disposed in the input passage in the feeding direction of the printed matter and a permanent magnet for magnetically biasing the magnetic ink on said printed matter.

3. An apparatus as set forth in claim 1, wherein said magnetic sensor means includes a pinch roller biased with spring means for pressing the printed matter to the magnetic sensor means.

4. An apparatus as set forth in claim 3, wherein the feeding means comprises at least a pair of a driving roller and a holding roller.

5. An apparatus as set forth in claim 4, wherein the pinch roller rotates in the same direction and at the same speed as the rollers of the feeding means.

6. An apparatus as set forth in claim 1, wherein the printed matter is paper money and the standard signal includes a plurality of series of reference data corresponding to a plurality of denominations of the paper money respectively.

7. An apparatus as set forth in claim 1, wherein the sample data and reference data are binary data.

8. An apparatus as set forth in claim 1, wherein the datum of the sample data and reference data consists of a plurality of bits such as 4, 8 or 16 bits.

* * * * *